United States Patent [19]

Matthews

[11] Patent Number: 4,504,397
[45] Date of Patent: Mar. 12, 1985

[54] REMOVAL OF SEDIMENTARY CONSTITUENTS FROM LIQUIDS

[75] Inventor: William E. Matthews, Old Ocean, Tex.

[73] Assignee: Phillips Petroleum Company, Bartlesville, Okla.

[21] Appl. No.: 430,632

[22] Filed: Sep. 30, 1982

[51] Int. Cl.³ ............................................. B01D 21/02
[52] U.S. Cl. .................................... 210/804; 210/138; 210/525; 422/101; 436/177
[58] Field of Search .................... 422/101; 436/177; 210/702, 709, 800, 803, 804, 85, 138, 141, 142, 322, 513, 523, 525, 532.1

[56] References Cited

U.S. PATENT DOCUMENTS 3,369,405  2/1968  Galegar .............................. 73/421
4,229,971  10/1980  Ririe ................................. 436/177

Primary Examiner—Frank Sever
Attorney, Agent, or Firm—French and Doescher

[57] ABSTRACT

Sedimentary constituents are removed from a liquid by first allowing the liquid to set for a period of time suitable for allowing a substantial proportion of the sedimentary constituents to settle out of the liquid and then pumping the liquid through a filter. After the liquid passes through the filter, the liquid is substantially free of sediment.

16 Claims, 1 Drawing Figure

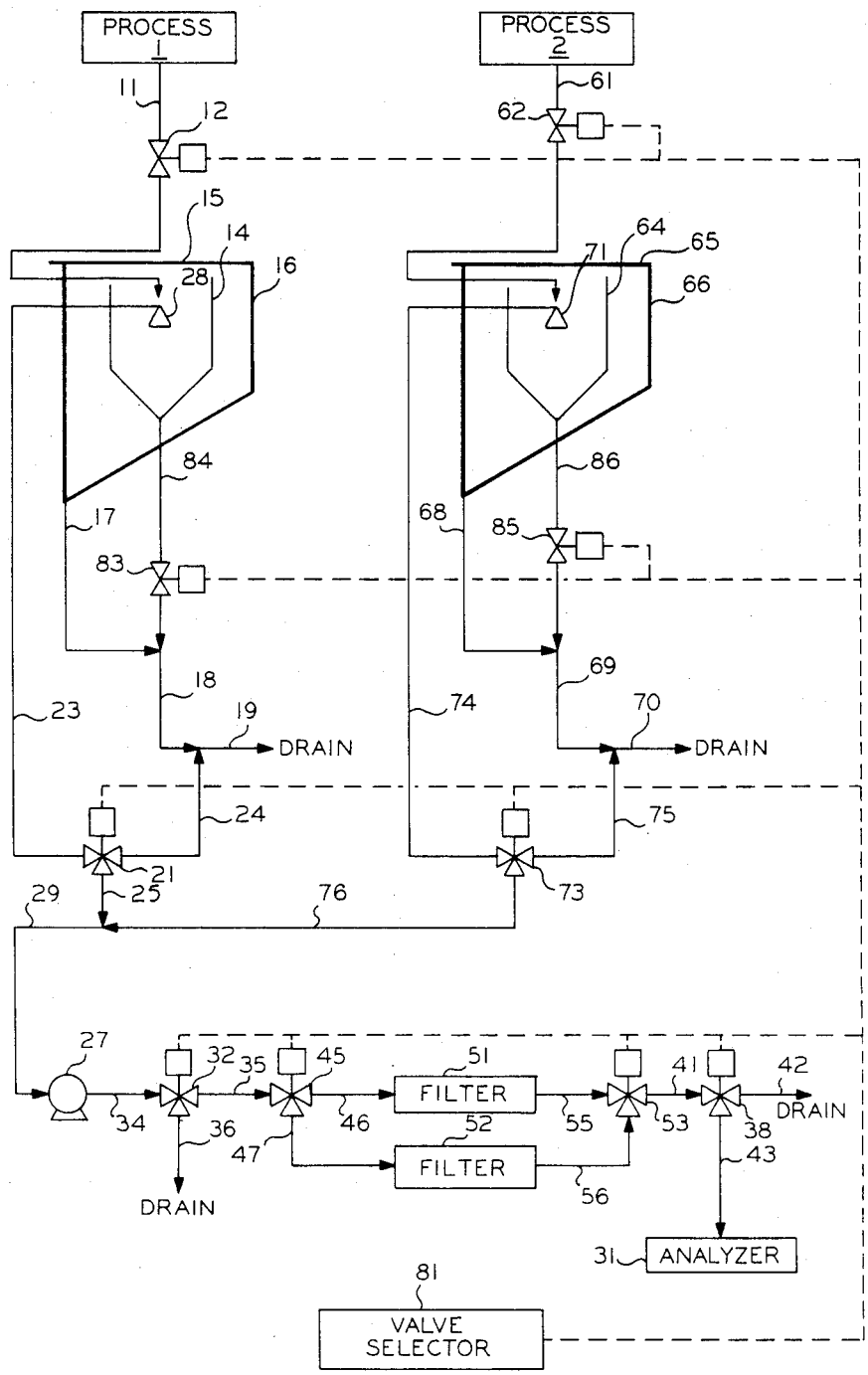

REMOVAL OF SEDIMENTARY CONSTITUENTS FROM LIQUIDS

This invention relates to method and apparatus for removing sedimentary constituents from liquids.

In many processes, it is desirable to be able to analyze a liquid which contains a high concentration of sedimentary constituents. An example of this is water used in a refinery. If the water is too hard, deposits will form in boilers and heat exchangers which is highly undesirable. Thus, it is desirable to be able to analyze the water to determine its hardness so that an appropriate treatment of the water to reduce hardness can be applied if needed. However, the water may contain such a high level of sedimentary constituents that it is not possible to analyze the water for hardness.

It is thus an object of this invention to provide method and apparatus for removing sedimentary constituents from a liquid so that the liquid can be analyzed.

In accordance with the present invention, method and apparatus is provided for settling the sedimentary constituents out of the liquid prior to pumping the liquid through a filter to an analyzer. The settling procedure substantially reduces the changing of a filter due to clogging of the filter and a liquid, substantially free of sediment, is provided to an analyzer.

Other objects and advantages of the invention will be apparent from the foregoing brief description of the invention and the claims as well as the detailed description of the drawing which is briefly described as follows:

FIG. 1 is a diagrammatic illustration of the sedimentary constituent removal system of the present invention for alternately analyzing two liquid streams.

The invention will be described in terms of an analysis of water to determine the hardness of the water. However, sedimentary constituents can be removed from any suitable liquid in accordance with the present invention to prepare the liquid for analysis.

The invention is also illustrated and described in terms of the alternate analysis of two streams of water coming from separate processes. However, the invention is applicable to the analysis of only one water stream or more than two water streams alternately.

Referring now to FIG. 1, water is withdrawn from process 1 through conduit means 11, in which control valve 12 is operably located, and is gravity fed to a sample pot 14. Overflow from the sample pot 14 is collected in the overflow pot 16 and is removed through the combination of conduit means 17, 18 and 19 to a drain.

After a desired sample has been collected in the sample pot 14, control valve 12 is closed and the sample is allowed to set while the sedimentary constituents settle out. Preferably, the water in the sample pot 14 is allowed to set for a time in the range of about 3 to about 5 minutes. Generally, about 95% of all sedimentary constituents will settle out during this time period.

The top of the sample pot 14 is preferably open while a hinged top 15 is preferably placed on the overflow pot 16. The top of the sample pot 14 could be closed if desired but it is preferred to use an open air design since the open air design readily allows visual observation of the interior surfaces of the sample pot 14 and facilitates manual cleaning and flushing of the sample pot 14. Also, the overflow pot 16 could be left open if desired, but rainwater could affect the analysis. Thus, a hinged top is preferred to prevent rainwater and other foreign materials from affecting the analysis while still providing easy access to the sample pot 14.

After a suitable settling time has passed, the control valve 21, which is operably located at the junction of conduit means 23, 24 and 25, is switched to a position such that fluid may flow through conduit means 23 to conduit means 25 (sample position as opposed to drain position). The water in the sample pot 14 is then pumped by means of pump 27 through a screened, conical particle filter 28 which is positioned above the sediment level. The thus removed water is provided through the combination of conduit means 23, 25 and 29 to the suction inlet of the pump 27.

When it is desired to provide a sample to the analyzer 31, control valve 32, which is operably located at the junction of conduit means 34, 35 and 36, is set to a position such that fluid may flow from conduit means 34 to conduit means 35 (sample position as opposed to drain position). In like manner, control valve 38, which is operably located at the junction of conduit means 41, 42 and 43, is set such that fluid flows from conduit means 41 through conduit means 43 (sample position as opposed to drain position). Control valve 45, which is operably located at the junction of conduit means 35, 46 and 47 is set to either provide the water flowing through conduit means 35 to the filter 51 or to the filter 52. Depending upon the setting of the control valve 45, the control valve 53, which is operably located at the junction of conduit means 41, 55 and 56 will be set to receive water from either filter 51 or filter 52.

A single filter could be utilized if desired. However, a dual filter design is preferred since this allows the water flow to be shifted while a filter is being replaced. At least about 98% of the sedimentary constituents in the water flowing from the processes will have been removed after passage through the filters 51 or 52.

Water from process 2 is treated in the same manner as water from process 1 to remove sediment. Water is removed from process 2 through conduit means 61, in which control valve 62 is operably located, and is provided to the sample pot 64. The overflow 66, which is covered by the hinged top 65, catches any water overflowing from the sample pot 64 and such overflow is provided through the combination of conduit means 68, 69 and 70 to a drain.

After the sedimentary constituents have settled out, water is removed through the screened, conical particle filter 71 and is provided through the control valve 73, which is operably located at the junction of conduit means 74, 75 and 76, to the suction inlet of the pump 27 in the same manner as previously described for water withdrawn from the sample pot 14.

The valve selector 81 is utilized to control the plurality of control valves illustrated in FIG. 1. The manner in which the control valves are manipulated and the sequence of such manipulation will be described more fully hereinafter.

In operation, control valves 12 and 62, as well as control valve 83, which is operably located in conduit means 84 and control valve 85 which is operably located in conduit means 86 will initially be in a closed position. Control valves 21, 73, 32 and 38 will be in a drain position. Assuming that filter 51 is on line, control valves 45 and 53 will be in the filter 51 position.

When it is desired to sample water from both process 1 and process 2, both control valves 12 and 62 can be opened at the same time if desired or opened at different times. Water will enter the sample pot 14 and the sample pot 64 until a suitable sample has been obtained at which time control valves 12 and 62 will be closed. After a suitable settling time has passed, control valves 21, 32 and 38 will be switched to the sample position and water will be pumped from the sample pot 14 to the analyzer 31. After a sufficient sample has been provided to the analyzer 31, control valve 21 is switched back to the drain position and control valve 83 is opened. The contents of the sample pot 14 are drained through the combination of conduit means 84, 18 and 19 which prevents accumulation of sediment between sample cycles. The ability to drain the sample pot 14 also facilitates flushing of the sample pot 14 during cleaning and prevents mixing of different water samples.

While the sample pot 14 is being drained, control valve 73 can be switched to the sample position and water can be pumped from the sample pot 64 to the analyzer 31. Again, after a sufficient sample of water has been provided to the analyzer 31, control valve 73 is switched back to the drain position and control valve 85 is opened to drain the sample pot 64 through the combination of conduit means 86, 69 and 70.

Using the above described procedure, water from process 1 and process 2 can be alternately provided to the analyzer 31. It is also noted that water from additional processes could be supplied to the analyzer 31 in a sequential manner using the above-described procedure.

Any suitable filters can be utilized as filters 51 and 52. Preferred filters are cartridge filters manufactured by AMF Cuno or Balstron.

Any suitable analyzer may be utilized to analyze the water. For the hardness analysis, an IONICS Model 3212 Analyzer was used.

The valve selector 81 may be a 5TI programmable control system, Texas Instruments, Inc.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a sample pot;
   means for providing a liquid containing sedimentary constituents to said sample pot, wherein said liquid is allowed to remain in said sample pot until a substantial portion of said sedimentary constituents have settled out of said liquid;
   a filter;
   means for removing liquid from said sample pot at a point above the level of the sediment formed by the settling out of said sedimentary constituents and for passing the thus withdrawn liquid through said filter to thereby produce a liquid from which a substantial portion of the sedimentary constituents have been removed;
   an analyzer; and
   means for providing the liquid from said filter to said analyzer.

2. Apparatus in accordance with claim 1 wherein said means for removing said liquid from said sample pot comprises a particle filter positioned in said liquid in said sample pot and above the level of the sediment formed by the settling out of said sedimentary constituents.

3. Apparatus in accordance with claim 1 additionally comprising:
   an overflow pot located so as to catch any liquid overflowing from said sample pot; and
   means for draining said overflow pot.

4. Apparatus in accordance with claim 3 wherein said sample pot is contained in said overflow pot, wherein the top of said sample pot is open and wherein said overflow pot is closed to the atmosphere by a hinged top.

5. Apparatus comprising:
   a first sample pot;
   means for providing a first liquid containing sedimentary constituents to said first sample pot, wherein said first liquid is allowed to remain in said first sample pot until a substantial portion of the sedimentary constituents have settled out of said first liquid;
   a second sample pot;
   means for providing a second liquid containing sedimentary constituents to said second sample pot, wherein said second liquid is allowed to remain in said second sample pot until a substantial portion of the sedimentary constituents have settled out of said second liquid;
   a first particulate filter positioned in said first liquid contained in said first sample pot and above the sediment formed by the settling out of the sedimentary constituents from said first liquid;
   a pumping means;
   a first control valve operably located so as to control the flow of said first liquid from said first particulate filter to said pumping means;
   a second particulate filter positioned in said second liquid contained in said second sample pot and above the level of the sediment formed by the settling out of the sedimentary constituents from said second liquid;
   a second control valve operably located so as to control the flow of said second liquid from said second particulate filter to the suction inlet of said pumping means;
   a first filter; and
   means for passing liquid from the discharge outlet of said pumping means through said first filter, wherein said first control valve is actuated so as to allow said first liquid to be pumped from said first sample pot when it is desired to pass said first liquid through said first filter and said second control valve is actuated so as to prevent the flow of said second liquid from said second sample pot to said first filter when it is desired to pass said first liquid through said first filter, wherein said second control valve is actuated so as to allow said second liquid to be pumped from said second sample pot through said first filter when it is desired to pass said second liquid through said first filter and said first control valve is actuated so as to prevent the flow of said first liquid from said first sample pot through said first filter when it is desired to pass said second liquid through said first filter, and wherein the sedimentary constituents in said first liquid and said second liquid are substantially removed from said first liquid and said second liquid after said first liquid and said second liquid pass through said first filter.

6. Apparatus in accordance with claim 5 additionally comprising:

a second filter;

a third control valve for allowing liquid to flow to either said first filter or said second filter;

a fourth control valve for allowing liquid to flow from either said first filter or said second filter, wherein said third control valve and said fourth control valve are actuated so as to allow liquid to flow through either said first filter or said second filter.

7. Apparatus is accordance with claim 6 additionally comprising:

an analyzer; and means for providing liquid passed through said fourth control valve to said analyzer.

8. Apparatus in accordance with claim 5 additionally comprising:

means for draining said first sample pot through a fifth control valve; and means for draining said second sample pot through a sixth control valve, wherein said fifth control valve is opened after a sample of said first liquid has been passed through said first filter and said first control valve is switched to a position such that said first liquid cannot flow from said first sample pot through said first filter so as to drain the sediment formed by the settling out of the sedimentary constituents in said first liquid and wherein said sixth sample valve is opened after a sample of said second liquid has been passed through said first filter and said second sample valve is switched to a position such that said second liquid cannot be provided from said second sample pot to said first filter so as to drain the sediment formed by the settling out of the sedimentary constituents in said second liquid.

9. A method for removing sedimentary constituents from a liquid comprising the steps of:

providing said liquid to a sample pot;

allowing said liquid to remain in said sample pot until a substantial portion of said sedimentary constituents have settled out of said liquid;

removing said liquid from said sample pot at a point above the level of the sediment formed by the settling out of said sedimentary constituents;

passing the liquid withdrawn from said sample pot through a filter to thereby produce a liquid from which a substantial portion of the sedimentary constituents have been removed; and providing the liquid passed through said filter to an analyzer.

10. A method in accordance with claim 9 wherein a particle filter positioned above the level of the sediment formed by the settling out of said sedimentary constituents is utilized to remove said liquid from said sample pot.

11. A method in accordance with claim 9 additionally comprising the step of using an overflow pot to catch any liquid overflowing from said sample pot.

12. A method in accordance with claim 11 wherein said sample pot is contained in said overflow pot, wherein the top of said sample pot is open and wherein said overflow pot is closed to the atmosphere by a hinged top.

13. A method for removing sedimentary constituents from first and second liquids comprising the steps of:

providing said first liquid to a first sample pot;

allowing said first liquid to remain in said first sample pot until a substantial portion of the sedimentary constituents have settled out of said first liquid;

providing said second liquid to a second sample pot;

allowing said second liquid to remain in said second sample pot until a substantial portion of the sedimentary constituents have settled out of said second liquid;

pumping said first liquid from said first sample pot through a first particulate filter positioned in said first liquid contained in said first sample pot and above the sediment formed by the settling out of the sedimentary constituents from said first liquid and passing said first liquid from said first settling pot through a first filter when it is desired to remove substantially all of the sedimentary constituents in said first liquid, wherein said second liquid cannot be passed through said first filter when said first liquid is being passed through said first filter; and pumping said second liquid from said second sample pot through a second particulate filter positioned in said second liquid contained in said second sample pot but above the sediment formed by the settling out of the sedimentary constituents from said second liquid and passing the second liquid from said second settling pot through a second filter when it is desired to remove substantially all of the sedimentary constituents in said second liquid, wherein said first liquid cannot be passed through said first filter when said second liquid is being passed through said first filter.

14. A method in accordance with claim 13 additionally comprising the step of passing said first liquid or said second liquid through a second filter when it is desired to change said first filter.

15. A method in accordance with claim 14 additionally comprising the step of providing said first liquid and said second liquid to an analyzer after said first liquid and said second liquid are passed through said first or second filter.

16. A method in accordance with claim 13 additionally comprising the steps of:

draining said first sample pot after a sample of said first liquid has been passed through said first filter and the pumping of said first liquid from said first sample pot is terminated; and draining said second sample pot after a sample of said second liquid has been passed through said first filter and the pumping of said second liquid from said second sample pot is terminated.

* * * * *